(12) United States Patent
Backhouse et al.

(10) Patent No.: US 6,450,203 B1
(45) Date of Patent: Sep. 17, 2002

(54) SEALED MICROFLUIDIC DEVICES

(75) Inventors: Christopher J. Backhouse; Herbert A. Hartshorne, both of Edmonton (CA)

(73) Assignee: Micralyne Inc., Edmonton (CA)

( * ) Notice: Subject to any disclaimer, the term of this patent is extended or adjusted under 35 U.S.C. 154(b) by 0 days.

(21) Appl. No.: 09/617,598

(22) Filed: Jul. 7, 2000

(51) Int. Cl.⁷ .................................................. F15B 21/00
(52) U.S. Cl. ...................... 137/807; 137/806; 137/827; 137/842; 137/251.1
(58) Field of Search ................................ 137/807, 806, 137/827, 842, 251.1

(56) References Cited

U.S. PATENT DOCUMENTS

| | | | | |
|---|---|---|---|---|
| 3,834,411 A | * | 9/1974 | Jones ........................ | 137/806 |
| 4,676,274 A | * | 6/1987 | Brown ....................... | 137/806 |
| 5,353,839 A | * | 10/1994 | Kordonsky et al. ......... | 137/806 |
| 5,398,726 A | * | 3/1995 | Sussman .................... | 137/806 |
| 6,152,181 A | * | 11/2000 | Wapner et al. .............. | 137/807 |

* cited by examiner

Primary Examiner—A. Michael Chambers
(74) Attorney, Agent, or Firm—Christensen, O'Connor, Johnson, Kindness PLLC (57) ABSTRACT

A method of controlling flow of a driven fluid in a channel, the channel being defined by an encircling wall, the method comprising the steps of sealing the channel with a sealing fluid immiscible in the driven fluid blocking the channel at an initial position, in which the sealing fluid has a first contact angle with the encircling wall and the driven fluid has a second contact angle with the encircling wall and the first contact angle is less than the second contact angle; and moving the sealing fluid in the channel by a force generated outside of the channel. Apparatus for controlling flow of a driven fluid in a channel, the apparatus comprising, an encircling wall defining a channel, a sealing fluid in the channel, the sealing fluid having a first contact angle with the encircling wall, a driven fluid in the channel having an interface with the sealing fluid, the driven fluid having a second contact angle with the encircling wall, the first contact angle being less than the second contact angle; and a force generator exterior to the channel, the force generator being operable to move the sealing fluid within the channel.

27 Claims, 12 Drawing Sheets

SEALED MICROFLUIDIC DEVICES

FIELD OF THE INVENTION

This invention relates to microfluidic fluid control, specifically to methods of sealing microfluidic channels and of pumping and valving in microfluidic channels.

BACKGROUND OF THE INVENTION

A wide range of microfluidic pumping and valving techniques have been reported. A common feature of these devices is that they are prone to leaking. Due to the scale of microfluidic devices the ratio of the perimeter of a microfluidic channel to its cross-sectional surface area is very high so that even if a channel is in some way plugged, small leaks occurring around the perimeter of the plug result in substantial fluid flow. In particular, if the seal is formed by a solid surface contacting another solid surface any gap between the surfaces, by design or by injury, creates a sizeable path for fluid flow. The microchannel application is also complicated by the requirement of providing control surfaces in the microchannel that can be manipulated from outside of the channel.

Several devices have been reported wherein a plug of sealing fluid, such as an air bubble, a plug of mercury or a plug of ferrofluid, that is immiscible in the driven fluid is used to attempt to create a blockage in a channel. As the plug more easily conforms to the shape of the channel the possibility of a gap occurring at the sealing surface, which is the surface of contact between the the sealing fluid and the channel, is reduced.

However, if a layer of driven fluid adheres to the channel wall between the channel wall and the plug of sealing fluid then that layer can act as a pathway for flow of driven fluid past the plug of sealing fluid, creating a breach of the seal. This situation can come about in several ways. The driven fluid may spontaneously replace the sealing fluid along the channel walls. It is also possible that the plug of sealing fluid is moved to a section of channel previously occupied by the driven fluid and the sealing fluid does not replace the driven fluid as the surface layer. Regardless of the mechanism by which a leakage layer forms, in a microfluidic system, such a leak around the plug of sealing fluid can permit a high flow of driven fluid.

SUMMARY OF THE INVENTION

This invention seeks to overcome this difficulty in the prior art by providing a hermetically sealing device and a method for controlling fluid flow within a channel, using a force that is generated by a device exterior to the channel.

There is therefore provided in accordance with an aspect of the invention, a method of controlling flow of a driven fluid in a channel, the channel being defined by an encircling wall, the method comprising the steps of:

sealing the channel with a sealing fluid blocking the channel at an initial position, in which the sealing fluid has a first contact angle with the encircling wall and the driven fluid has a second contact angle with the encircling wall and the first contact angle is less than the second contact angle and in which the driven fluid is immiscible in the sealing fluid; and moving the sealing fluid in the channel by a force generated outside of the channel.

According to a further aspect of the invention, there is provided apparatus for controlling flow of a driven fluid in a channel, the apparatus comprising:

an encircling wall defining a channel;

a sealing fluid in the channel, the sealing fluid having a first contact angle with the encircling wall;

a driven fluid in the channel having an interface with the sealing fluid, the driven fluid being immiscible in the sealing fluid and having a second contact angle with the encircling wall, the first contact angle being less than the second contact angle; and a force generator exterior to the channel, the force generator being operable to move the sealing fluid within the channel.

It is therefore an object of this invention to prevent leakage around a microfluid seal in a microchannel, by using preferential affinity of a sealing fluid for a channel wall as compared with the affinity of a driven fluid for the channel wall, and by providing an externally generated force to control the position of the sealing fluid.

It is another object of this invention to provide fluid control devices based on application of the principle of the invention.

BRIEF DESCRIPTION OF THE DRAWINGS

Preferred embodiments of the invention will now be described with reference to the drawings by way of illustration, in which like reference characters denote like elements, in which exemplary dimensions are given, and in which.

DETAILED DESCRIPTION OF PREFERRED EMBODIMENTS

Figure 1:
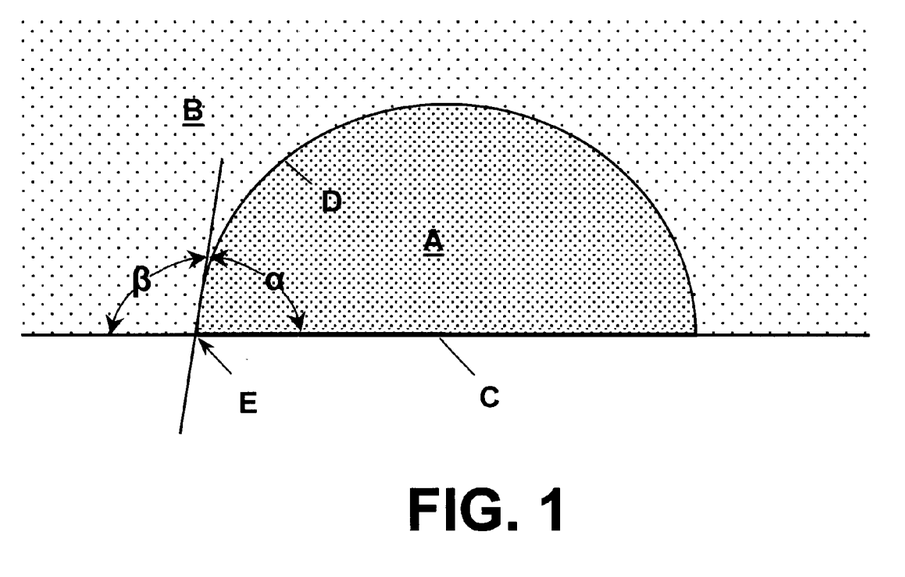
FIG. 1 is a schematic showing a three phase boundary between a fluid A, a fluid B and a solid surface C.

The important parameters in the formation of a leakage layer in a microchannel are the relative surface energies (or surface tensions) of the fluids and the channel wall. The phenomena of interest can be most easily expressed in terms of the contact angle at a three phase boundary defined by the meniscus of a fluid A contacting a fluid B meeting a solid surface C as shown in FIG. 1. In FIG. 1, surface C may be the interior surface of a channel in which fluids A and B are confined. Fluid A may be a fluid used to block the channel and control movement of fluid B in the channel. Fluid B may be a driven fluid, such as commonly used in biochemical applications in microchips. The driven fluid may contain particles in suspension, such as cells.

The angle of the meniscus D in relation to the solid surface C at the point of contact E is called the contact angle. The contact angle of fluid A is the angle $\alpha 0$ between the solid surface C and the meniscus D as measured through fluid A. The contact angle of fluid B is the angle $\beta$ between the solid surface C and the meniscus D as measured through fluid B. Angle $\alpha$ is the compliment of the contact angle $\beta$. In such a 3-phase system the fluid with the lowest contact angle adheres preferentially to the solid surface C. A better seal is formed when the fluid A is the used to seal a channel against movement of the fluid B since the fluid A preferentially seals against the solid surface C. Thus, a hermetic seal or block in the channel may be formed when the sealing fluid has a lower contact angle with the channel wall than has the driven fluid. Movement of the sealing fluid to selectively block and unblock the channel or to change the position of the seal within the channel may be used to form a valve, a pump or other fluid control devices. Obtaining the desired contact angles of the fluids A and B is dependent upon the relative properties of the fluids and the channel wall.

Figure 2:
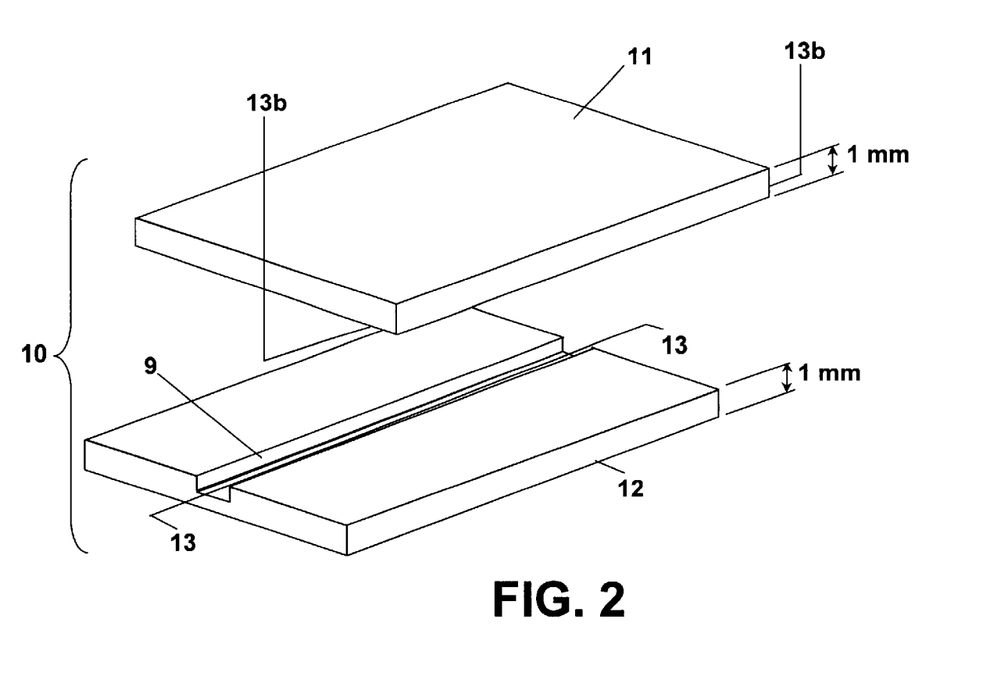
FIG. 2 is an exploded view of a microfluidic chip with a single channel.

FIG. 2 shows an exploded view of a channel 9 in a microchip 10 which is formed by bonding a cover plate 11 to a substrate 12 into which the channel 9 is formed. The formation of channel 9 is by standard micromachining techniques: by etching, ablating or otherwise removing material from 12 or from a film of material deposited on 12 to form the channel trench, or by sputtering, electroforming or otherwise building up material on the substrate 12 to form the channel walls. The channel 9 might also be formed in a plastic material using standard plastics processing techniques and using as a master or mold a glass, silicon or metal substrate formed by application of the micromachining techniques above. Methods of making microchips having microchannels with cross-sectional dimensions in the order of a several micrometers to several hundreds of micrometers are well known.

Figure 3A:
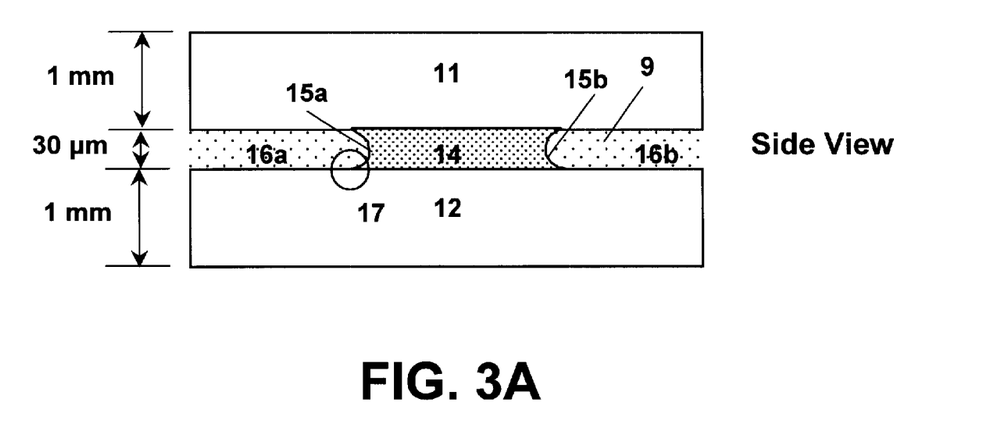
FIG. 3 shows a cross section of the chip of FIG. 2 along line 13—13 and in which the channel has been filled with a sealing fluid and a driven fluid.
Figure 3B:
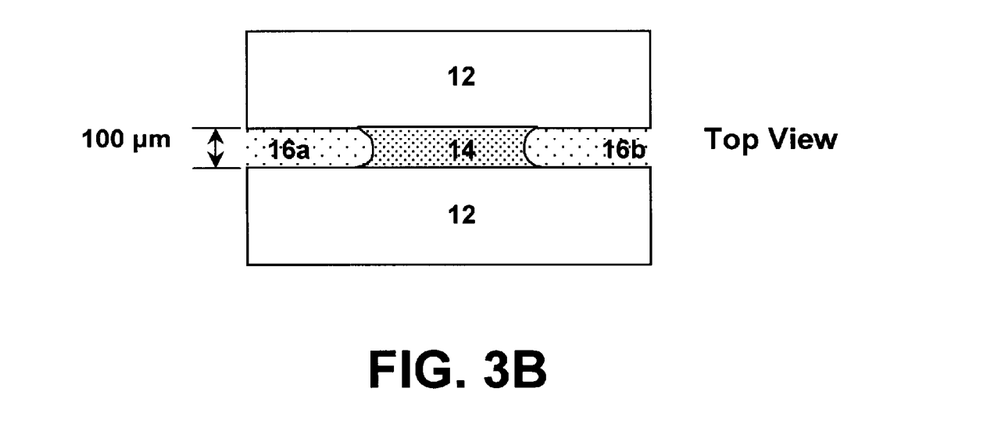
Figure 4:
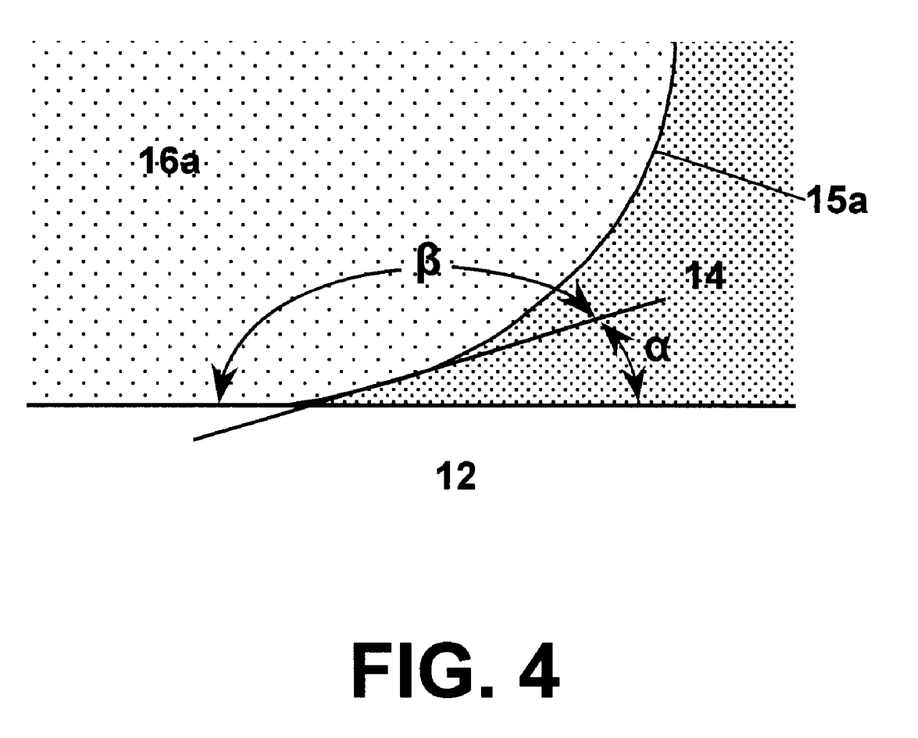
FIG. 4 is a detail of FIG. 3 showing the contact angles of the sealing fluid and the driven fluid.

FIG. 3*a* shows a cross-sectional view of the device 10 along the line 13 and in which the channel has been filled with a plug of sealing fluid 14 forming a first interface 15*a* with a first driven fluid 16*a* at one end of the plug 14 and a second interface 15*b* with a second driven fluid 16*b* at the other end of the plug 14. Driven fluids 16*a* and 16*b* may be, but are not necessarily, the same fluid. FIG. 3*b* shows a cross-sectional view of the device 10 along the line 13*b*. Detail 17, shown magnified in FIG. 4, shows the contact angle $\alpha$ of plug 14 and the contact angle $\beta$ of the driven fluid 16*a*, $\alpha < \beta$ so as to form an essentially leakless seal.

Figure 5A:
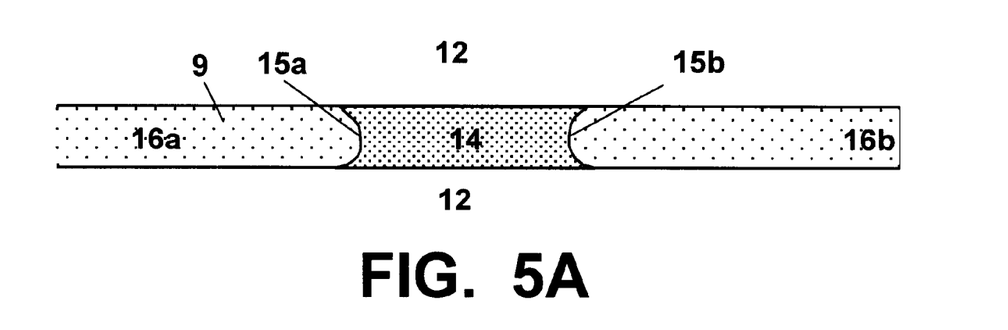
FIG. 5 shows a cross-section as in FIG. 3 of the construction and operation of a first embodiment of the invention where the apparatus acts as a valve.
Figure 5B:
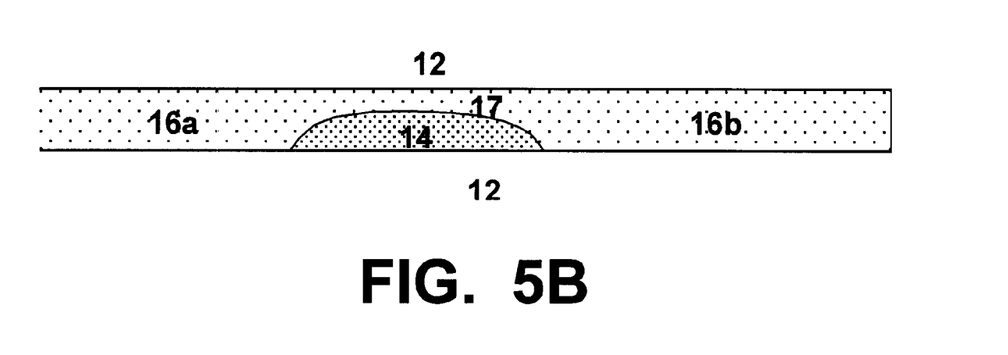

FIG. 5*a* shows a sealing fluid plug 14 intact in a channel as in FIG. 3*b* with the plug 14 blocking the channel. FIG. 5*b* shows a controlled rupture of the seal in FIG. 5*a* to allow a path 17 for flow of driven fluid past the sealing fluid 14.

Figure 6A:
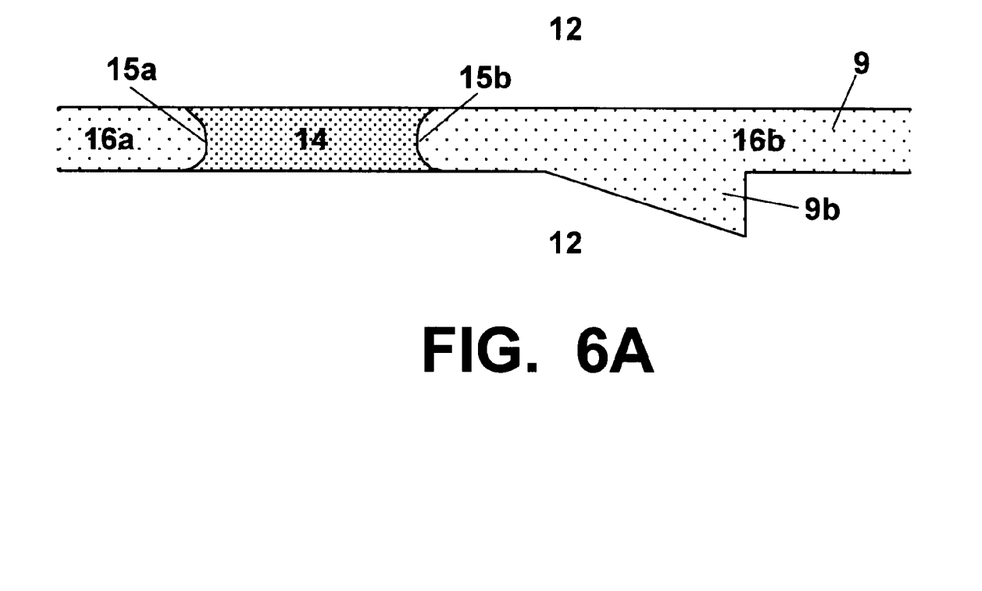
FIG. 6 shows a cross-section as in FIG. 3 of the construction and operation of a second embodiment of the invention where the apparatus acts as a valve.
Figure 6B:
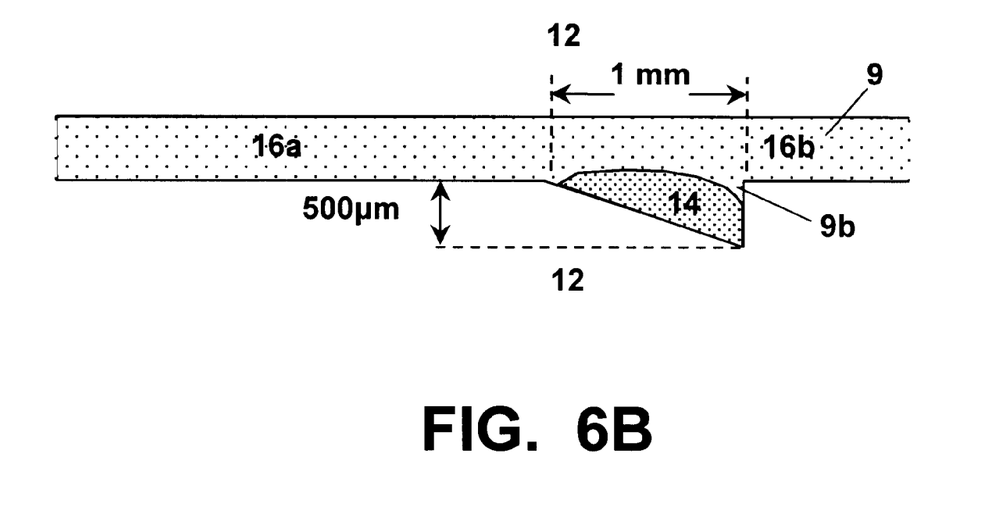

FIG. 6*a* shows a sealing fluid plug 14 intact in a channel as in FIG. 3*b* with a tapered section 9*b*. In the tapered section 9*b*, the channel width enlarges with distance along the channel. FIG. 6*b* shows the sealing fluid drawn into 9*b* thereby breaking the seal, unblocking the channel and allowing driven fluid to flow past the sealing fluid. Using a tapered channel makes it easier to move the fluid into and out of the reservoir formed by the section 9*b*. Using the reservoir 9*b* makes it easier to break the adhesion between the sealing fluid and the channel wall. The taper in the channel produces a differential capillary force which will tend to draw the ferrofluid into the taper, thus assisting in the closure of the valve. If the flow of driven fluid is from left to right in the figure, the opening of the valve is assisted as the left to right flow of driven fluid pushes the sealing fluid into the reservoir.

Figure 7A:
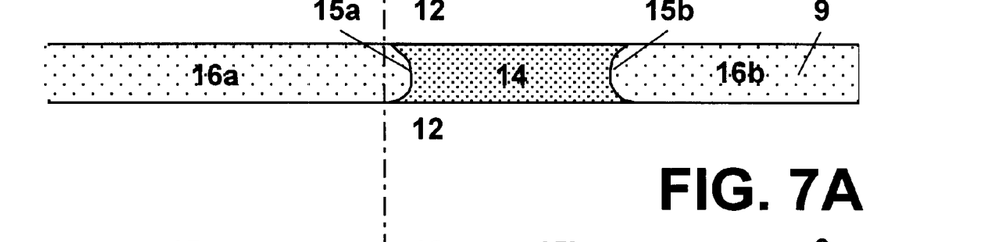
FIG. 7 shows a cross-section as in FIG. 3 of the construction and operation of a third embodiment of the invention where the apparatus acts as the piston of a pump.
Figure 7B:
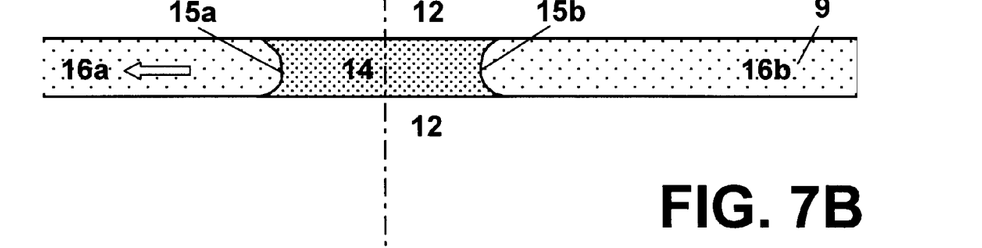
Figure 7C:
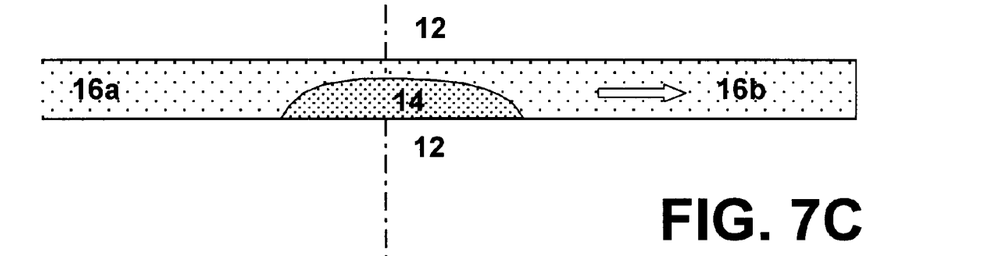
Figure 7D:
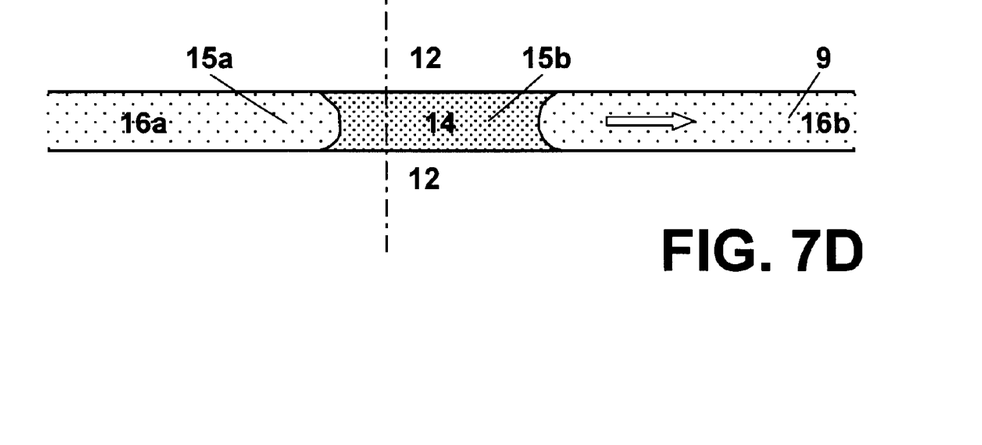

FIG. 7*a* shows a sealing fluid plug 14 intact and blocking a channel as in FIG. 3*b*. FIG. 7*b* shows the sealing fluid plug 14 being moved along the channel 9 thus driving the driven fluid 16*a* ahead of the seal and thereby forming the piston of a pump. In FIG. 7*c* the sealing fluid is returned with the seal broken and the channel unblocked. In FIG. 7*d* the sealing fluid is returned with the seal intact.

Figure 8A:
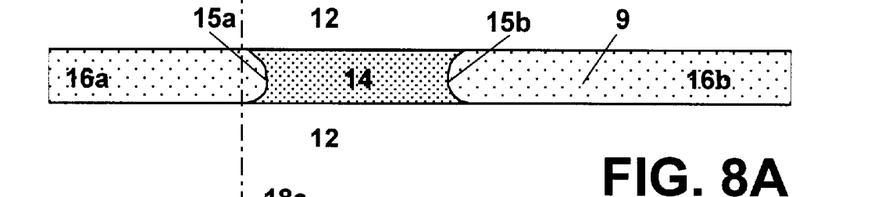
FIG. 8 shows a cross-section as in FIG. 3 of the construction and operation of a fourth embodiment of the invention where the apparatus acts as a pump.
Figure 8B:
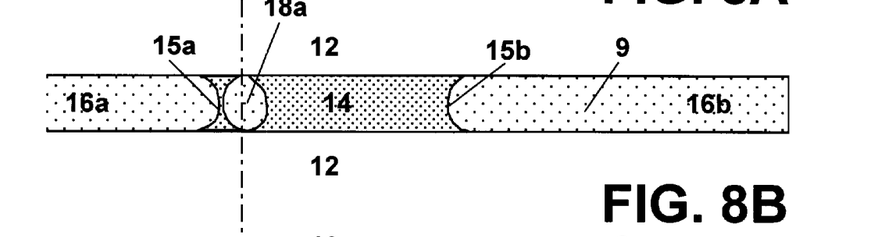
Figure 8C:
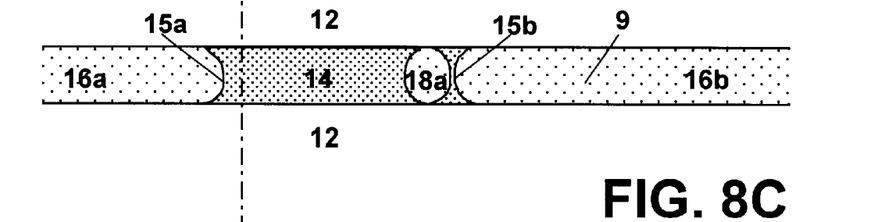
Figure 8D:
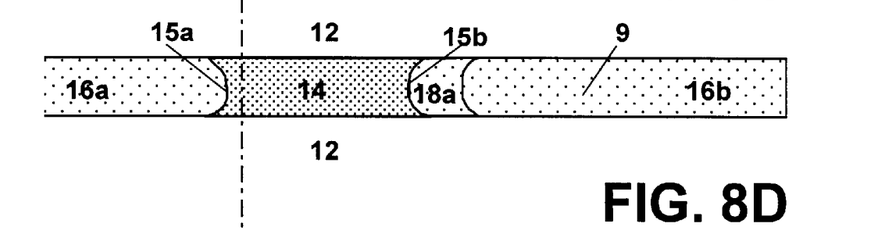
Figure 8E:
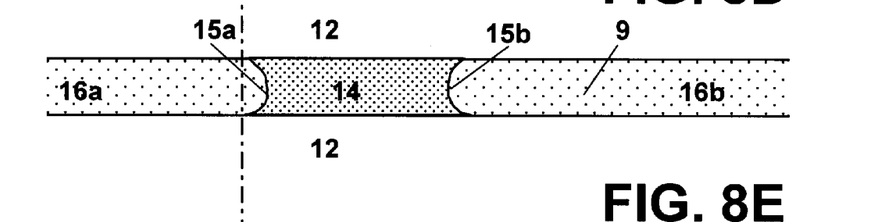
Figure 8F:
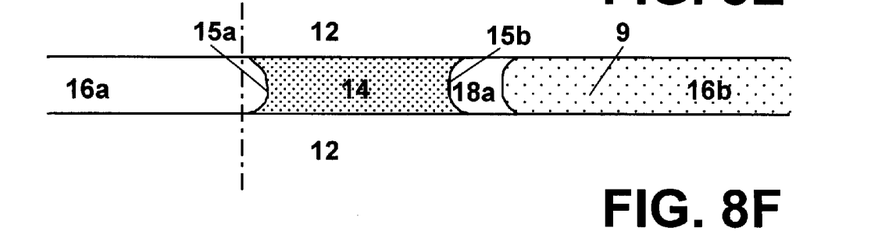

FIG. 8*a* shows a sealing fluid plug 14 intact and blocking a channel as in FIG. 3*b*. FIG. 8*b* shows the sealing fluid separating a droplet of the driven fluid 18*a* from the body of driven fluid 16*a*. FIG. 8*c* shows the droplet of driven fluid 18*a* being moved along the sealing fluid plug 14 until it reaches the second interface 15*b*. FIG. 8*d* shows 18*a* being expelled from the sealing fluid plug 14 into the second body of driven fluid 16*b*. FIG. 8*e* shows the sealing fluid plug 14 returned to its original position in the channel: in this particular case, fluids 16*a* and fluids 16*b* are the same. FIG. 8*f* is similar to FIG. 8*e* except that in this case fluid 16*a* is immiscible in fluid 16*b* so that the droplet 18*a* maintains its integrity.

Figure 9:
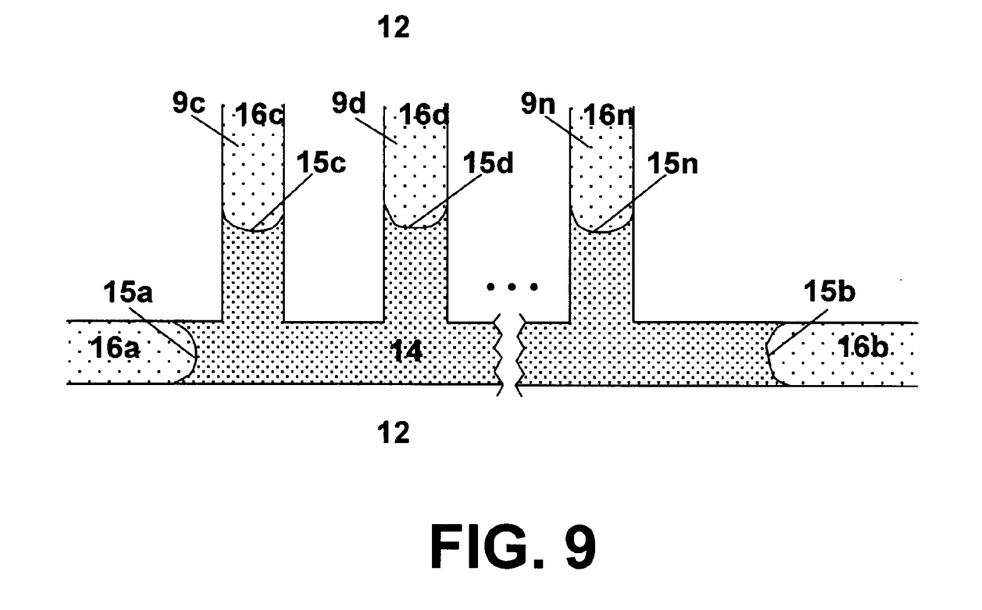
FIG. 9 shows a cross-section of the chip of FIG. 2 along the line 13b—13b of the construction and operation of a fourth embodiment of the invention where the invention acts as a pump capable of pumping one of several fluids to one of several locations.

FIG. 9 shows a sealing fluid plug 14 intact and blocking a channel as in FIG. 3*b*, with additional channels 9*c*, 9*d* . . . 9*n* forming junctions with channel 9 and with additional sealing fluid/driven fluid interfaces 15*c* . . . 15*n* being formed in channels 9*c* . . . 9*n* between the body of sealing fluid 14 and bodies of driven fluid 16*c* . . . 16*n*. A volume of driven fluid can be separated from a body of driven fluid at any interface and moved to any other interface by the mechanism of FIG. 8.

The sealing fluid is preferably a ferrofluid immiscible in the selected driven fluid, for example the proprietary ferrofluid NF 554A (Ferrofluidics Inc.) for use with an aqueous driven fluid or the aqueous ferrofluid EMG 508 (Ferrofluidics Inc.) for use with a nonpolar driven fluid. The external force required to actuate the device will be, if using a ferrofluid as the sealing fluid, created within the ferrofluid by means of a non-uniform magnetic field such as can be produced with a small permanent magnet (for example the Jobmax 24 series of Samarium-Cobalt magnets from Jobmaster Magnets Canada Inc.). If the sealing fluid is a dielectric then a nonuniform electrical field, either AC or DC, can generate the required force, with an AC field being a feasible way to avoid reactions due to electrolysis of the sealing fluid.

Figure 10A:
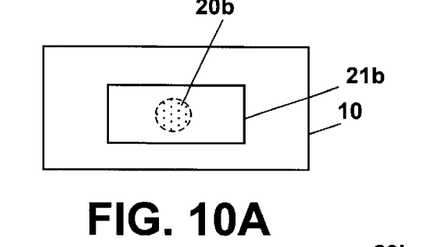
FIGS. 10a, 10b and 10c are respectively a plan view, side view and end view of an exemplary method of actuation of the second embodiment wherein the sealing fluid is a ferrofluid and the force is generated by a permanent magnet.
Figure 10B:
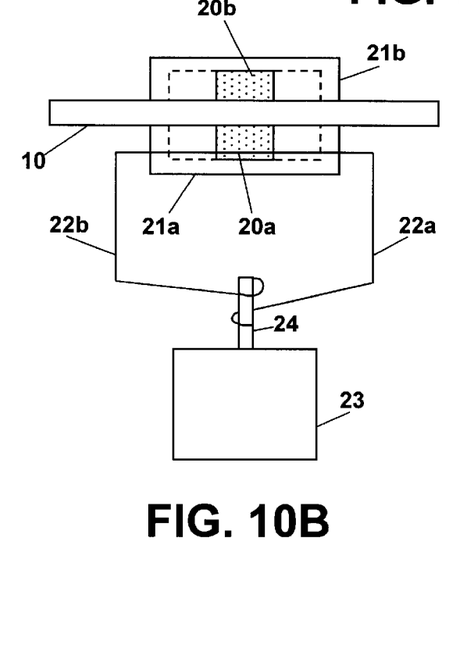
Figure 10C:
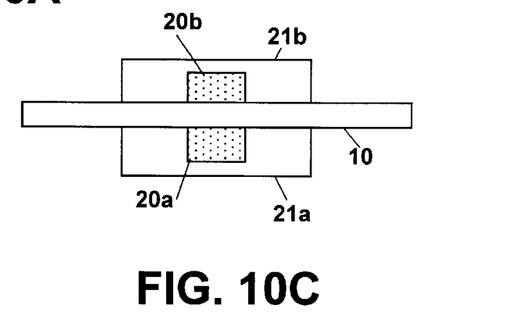
Figure 10D:
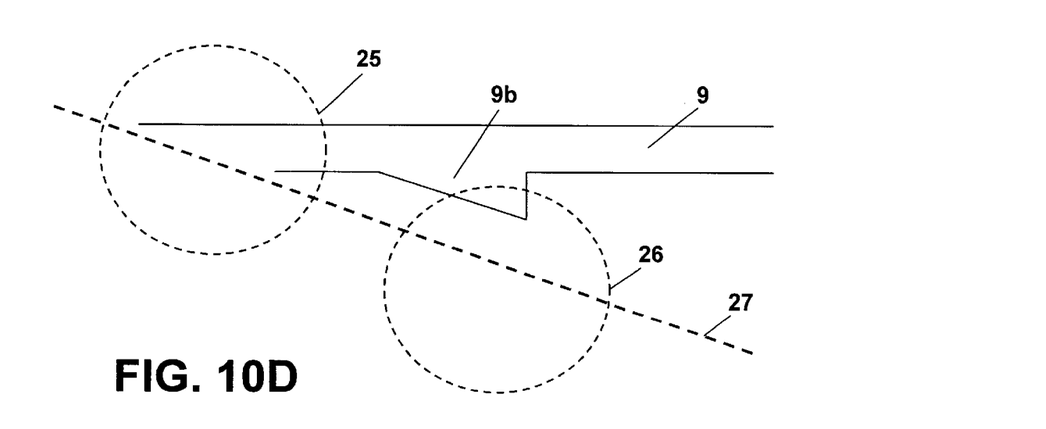
FIG. 10d is a schematic showing application of the apparatus of FIGS. 10a–10c to a channel with a tapered reservoir.

FIGS. 10a–10c are respective orthographic projections of an arrangement of an actuation method for the embodiment of FIG. 6 if the sealing fluid 14 is a ferrofluid and the magnetic field is provided by permanent magnets 20 actuated by a stepper motor 23. The magnet 20a is confined to a linear path along the guide 21a and is pulled along the path by tension in the strings 22a and 22b as produced by the rotation of the stepper motor 23. The strings 22a and 22b are wrapped in opposing directions around the shaft 24 so that one string will wrap around the shaft and one string will unwrap from the shaft when the shaft rotates. The optional magnet 20b increases the magnitude of the magnetic field in the volume between the magnets and is confined to a linear path by the guide 21b. The magnet 20b can be pulled along the guide 21b under the influence of the magnet 20a, or can optionally be actuated as is magnet 20a by use of the same or another stepper motor. FIG. 10d shows a birds-eye view of the device 10 wherein the dotted circle 25 indicates the position of the magnets 20 when the valve is closed and the dotted circle 26 indicates the position of the magnets when the valve is open. Line 27 indicates the path of the center of the magnets as they travel along guides 21.

Figure 11A:
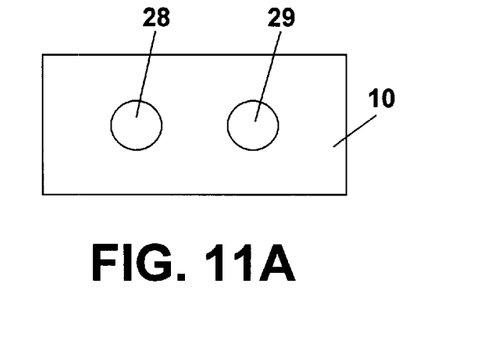
FIGS. 11a, 11b and 11c are respectively a plan view, side view and end view of an exemplary method of actuation of the second embodiment wherein the sealing fluid is a ferrofluid and the force is generated by electromagnets.
Figure 11B:
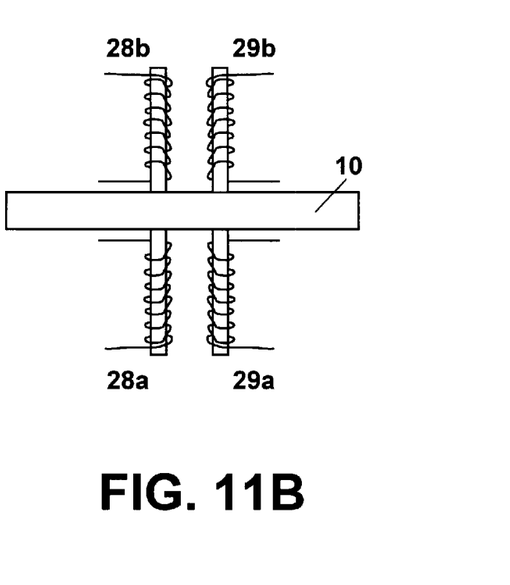
Figure 11C:
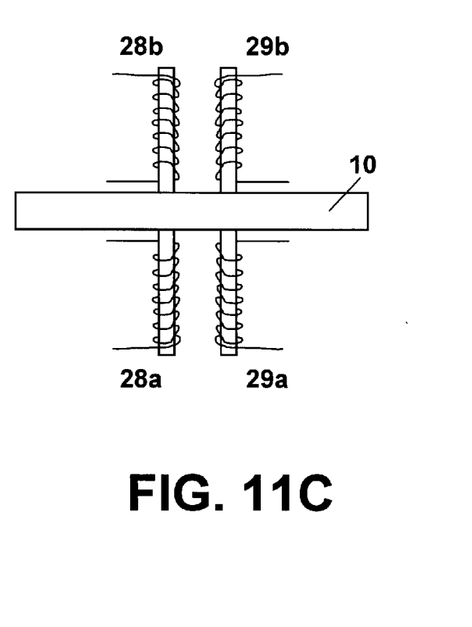
Figure 11D:
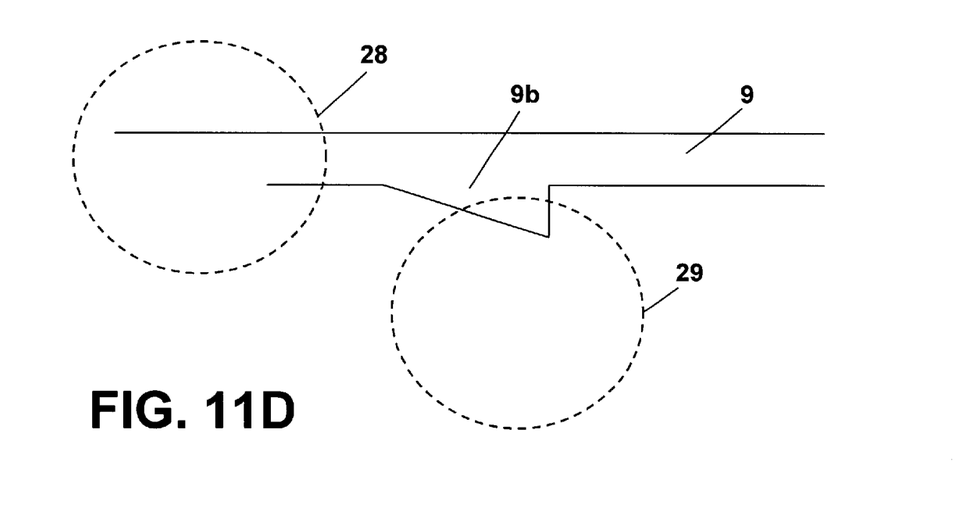
FIG. 11*d* is a schematic showing application of the apparatus of FIGS. 11*a*–11*c* to a channel with a tapered reservoir.

FIGS. 11a–11c are respective orthographic projections of an arrangement of an actuation method for the embodiment of FIG. 6 if the sealing fluid 14 is a ferrofluid and the magnetic field is provided by electromagnets 28 and 29. The electromagnets are stationary and are seperately controlled so that they can each be energized or de-energized at will. The optional electromagnets 28b and 29b increase the magnitude of the electromagnetic field in the volume between the pairs 28 and 29 respectively. FIG. 11d is a birds-eye view showing the positioning of the electromagnet (pairs) relative to the reservoir 9b. The valve is closed by energizing electromagnets 28 and de-energizing electromagnets 29. The valve is opened by energizing electromagnets 29 and de-energizing electromagnets 28. An array of several electromagnets actuated sequentially may be used to increase the number of discrete equilibrium points for the ferrofluid. The electromagnets may be external as in FIG. 11 or may be integrated into the substrate using standard micromachining techniques.

Figure 12A:
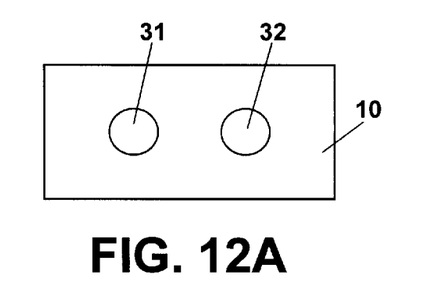
FIGS. 12*a*, 12*b* and 12*c* are respectively a plan view, side view and end view of an exemplary method of actuation of the second embodiment wherein the sealing fluid is a dielectric and the force is generated by pairs of electrodes.
Figure 12B:
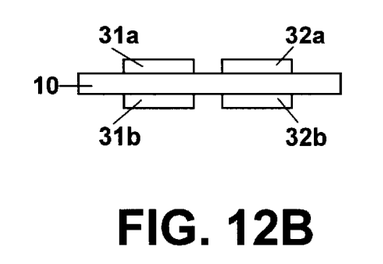
Figure 12C:
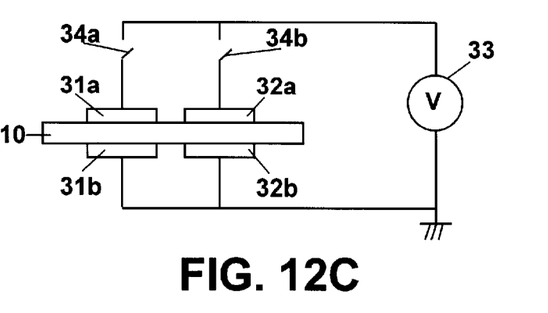
Figure 12D:
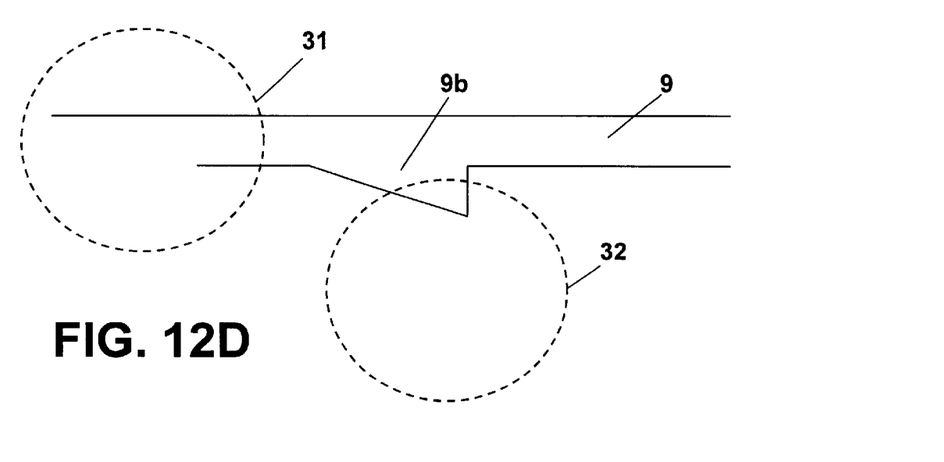
FIG. 12*d* is a schematic showing application of the apparatus of FIGS. 12*a*–12*c* to a channel with a tapered reservoir.

FIGS. 12a–12c are respective orthographic projections of an arrangement of an actuation method for the embodiment of FIG. 6 if the sealing fluid 14 is a dielectric and the electric field is provided by electrode pairs. Separate electrode pairs 31 and 32 define separate discrete equilibrium locations for the sealing fluid in the device 10. The electrodes are energized by the voltage supply 33 and the switches 34. FIG. 12db is a birds-eye view showing the positioning of the electrode pairs relative to the reservoir 9b. The valve is closed by energizing electrodes 31 and de-energizing electrodes 32. The valve is opened by energizing electrodes 32 and de-energizing electrodes 31. The electrodes may be external as in FIG. 12 or may be integrated into the substrate using standard micromachining techniques.

The channel is preferably formed from a surface modified glass (such as Corning 0211), surface modified silicon, or plastic with or without surface modification as required to obtain the correct relative surface energies of the driven fluid, the sealing fluid and the channel walls. The surface modification can be done by using standard micromachining techniques to mask off the sections of the substrate which are not to be modified and by then applying the modification, again by standard micromaching techniques such as spin-coating or dip-coating a liquid modifier (such as a solution of FDTS (1H, 1H, 2H, 2H-perfluorodecycletrichlorosilane, Dupont) in iso-octane, Teflon SF-727-60 (Dupont) or Fluorad 722 (3M) or other suitable fluoropolymer), sputtering a solid modifier (for example a thin film of Teflon™, or a fluoropolymer having similar properties, or metal), or by reacting the exposed surface with a suitable chemical vapour or plasma. The surface modification can also be done to an already bonded device by flowing an appropriate fluid through the channels.

Immaterial modifications may be made to the invention described without departing from the essence of the invention.

We claim:

1. A method of controlling flow of a driven fluid in a channel, the channel being defined by an encircling wall, the method comprising the steps of:
    sealing the channel with a sealing fluid blocking the channel at an initial position, in which the sealing fluid has a first contact angle with the encircling wall and the driven fluid has a second contact angle with the encircling wall and the first contact angle is less than the second contact angle and in which the driven fluid is immiscible in the sealing fluid; and
    moving the sealing fluid in the channel by a force generated outside of the channel.

2. The method of claim 1 in which the driven fluid is pumped by driving the driven fluid with the sealing fluid while the channel is blocked by the sealing fluid.

3. The method of claim 2 further comprising the step of returning the sealing fluid to the initial position while the channel is unblocked.

4. The method of claim 2 further comprising the step of returning the sealing fluid to the initial position while the channel is blocked.

5. The method of claim 1 in which flow of the driven fluid is controlled by repeatedly blocking and unblocking the channel by moving the sealing fluid in and out of the path of the driven fluid.

6. The method of claim 5 in which the sealing fluid is moved into a reservoir to unblock the channel.

7. The method of claim 6 in which the reservoir has a breadth greater than the width of the channel.

8. The method of claim 7 in which the reservoir is tapered.

9. The method of claim 1 in which the sealing fluid forms a plug having a first end and a second end, the sealing fluid having a first interface with the driven fluid at the first end and a second interface with the driven fluid at the second end; the method further comprising the step of:
    manipulating the sealing fluid at the first interface to enclose a volume of driven fluid within the sealing fluid.

10. The method of claim 9 further comprising the step of manipulating the sealing fluid to move the enclosed volume of driven fluid from the first interface to the second interface.

11. The method of claim 9 where the body of sealing fluid occupies a section of channel that is geometrically different from the sections of channels occupied by the driven fluid.

12. The method of claim 1 in which the sealing fluid is a ferrofluid and the force generator is a permanent magnet or an electromagnet.

13. The method of claim 1 in which the encircling wall is made from a surface modified glass.

14. The method of claim 1 in which the driven fluid is a fluid carrying particles in suspension.

15. Apparatus for controlling flow of a driven fluid in a channel, the apparatus comprising:

an encircling wall defining a channel;

a sealing fluid in the channel, the sealing fluid having a first contact angle with the encircling wall;

a driven fluid in the channel having an interface with the sealing fluid, the driven fluid being immiscible in the sealing fluid and having a second contact angle with the encircling wall, the first contact angle being less than the second contact angle; and a force generator exterior to the channel, the force generator being operable to move the sealing fluid within the channel.

16. The apparatus of claim 15 in which the sealing fluid is a ferrofluid and the force generator is selected from the group consisting of a permanent magnet and an electromagnet.

17. The apparatus of claim 15 in which the sealing fluid occupies an enlarged portion of the channel.

18. The apparatus of claim 15 further comprising in which the channel intersects another channel at a junction, and the force generator is operable to move the sealing fluid towards and away from the junction.

19. The apparatus of claim 15 in which the force generator is operable to reciprocate the sealing fluid within the channel.

20. The apparatus of claim 15 in which the channel is formed in a first substrate, and a second substrate is bonded to the first substrate to close the channel.

21. The apparatus of claim 20 in which the first and second substrates are each formed from a material selected from the group consisting of glass and silicon.

22. The apparatus of claim 20 in which the first and second substrates are each formed from plastic.

23. The apparatus of claim 15 in which the encircling wall is surface modified.

24. The apparatus of claim 23 in which the encircling wall is surface modified by application of a coating to the encircling wall.

25. The apparatus of claim 23 in which the coating is FDTS.

26. The apparatus of claim 23 in which the coating is a fluoropolymer.

27. The apparatus of claim 23 in which the coating is a metal.

* * * * *

UNITED STATES PATENT AND TRADEMARK OFFICE
CERTIFICATE OF CORRECTION

PATENT NO.    : 6,450,203 B1
DATED         : September 17, 2002
INVENTOR(S)   : C.J. Backhouse et al.

It is certified that error appears in the above-identified patent and that said Letters Patent is hereby corrected as shown below:

Title page,
Item [56], References Cited, U.S. PATENT DOCUMENTS, insert:
-- 3,906,415  9/1975  Baker
   4,050,851  9/1977  Haavik
   4,445,696  5/1984  Raj et al.
   4,579,173  4/1986  Rosensweig et al.
   4,808,079  2/1989  Crowley et al.
   5,005,639  4/1994  Leland
   5,213,479  5/1993  Dardis et al.
   5,541,072  7/1996  Wang et al.
   5,622,831  4/1997  Liberti et al. --;
FOREIGN PATENT DOCUMENTS, insert:
-- GB   2140128   11/1984 --; and insert:
-- OTHER PUBLICATIONS
LookSmart computer search for "ferrofluid" indicating "The Design of a Ferrofluid Magnetic Pipette", 9/3/98, 3 pages.
A Survey of FerromagneticLiquid Applications, M.P. Perry, pp. 219-230, Thermomechanics of Magnetic Fluids, Theory and Applications, Edited by B. Berkovsky, Science Sector, UNESCO, Proceedings of the International Advanced Course and Workshop on Thermomechanics of Magnetic Fluids Organized by the International Centre for Mechanical Sciences, cited reference to "Magnetic Fluids: Magnetic Forces and Pumping Mechanisms," C.W. Miller, Sibley School of Mechanical and Aerospace Engineering, Cornell University, Ithaca, New York. Final Technical Report, Sep. 1973.
The Design of a Ferrofluid-Magnetic Pipet, Nancy E. Greivell, Jun. 1995, cover page and pp. 3-5 and 21-56.
Magnetic Fluids: Magnetic Forces and Pumping Mechanisms, Constance Warren Miller, Jan. 1974, cover page, p. 1 and pp. 91-109.
Development of an Elctromagnetically Actuated Marcury Microvalve, Douglas R. Adkins and C. Channy Wong, DSC-Vol. 66, Micro-Electro-Mechanical Systems (MEMS) - 1998 (ASME 1998), pp. 133-137.
Microactuation by Continuous Electrowetting Phenomenon and Silicon Deep Rie Process, Junghoon Lee and Chang-Jin "CJ" Kim, DSC-Vol. 66, Micro-Electro-Mechanical Systems (MEMS) - 1998 (ASME 1998), pp. 475-480.

UNITED STATES PATENT AND TRADEMARK OFFICE
CERTIFICATE OF CORRECTION

PATENT NO. : 6,450,203 B1
DATED : September 17, 2002
INVENTOR(S) : C.J. Backhouse et al.

It is certified that error appears in the above-identified patent and that said Letters Patent is hereby corrected as shown below:

<u>Title page (cont'd)</u>,
Study of MHD (Magnetohydrodynamic) Micropump, Kazuo Hosokawa, Isao Shimoyama and Hirohumi Miura, Paper No. 92-0446, 1993, pp. 205-210, with attached translations (8 pages). --

Signed and Sealed this

Sixth Day of July, 2004

JON W. DUDAS
*Acting Director of the United States Patent and Trademark Office*